US012279352B2

(12) United States Patent
Song

(10) Patent No.: US 12,279,352 B2
(45) Date of Patent: Apr. 15, 2025

(54) STRING LIGHT CIRCUIT WITH HUMAN BODY SENSING

(71) Applicant: Keyong Song, Taizhou (CN)

(72) Inventor: Keyong Song, Taizhou (CN)

( * ) Notice: Subject to any disclaimer, the term of this patent is extended or adjusted under 35 U.S.C. 154(b) by 154 days.

(21) Appl. No.: 18/351,616

(22) Filed: Jul. 13, 2023

(65) Prior Publication Data

US 2024/0023219 A1 Jan. 18, 2024

(30) Foreign Application Priority Data

Jul. 13, 2022 (CN) ......................... 202221800856.3

(51) Int. Cl.

| | |
|---|---|
| ***H05B 47/13*** | (2020.01) |
| ***H05B 45/3725*** | (2020.01) |
| ***H05B 45/46*** | (2020.01) |
| ***H05B 47/17*** | (2020.01) |
| *F21S 4/10* | (2016.01) |
| *F21Y 115/10* | (2016.01) |

(52) U.S. Cl.

CPC ......... *H05B 47/13* (2020.01); *H05B 45/3725* (2020.01); *H05B 45/46* (2020.01); *H05B 47/17* (2020.01); *F21S 4/10* (2016.01); *F21Y 2115/10* (2016.08)

(58) Field of Classification Search

CPC .. H05B 47/115; H05B 47/13; H05B 45/3725; H05B 45/46; H05B 47/17; F21S 4/10; F21Y 2115/10

See application file for complete search history.

(56) References Cited

U.S. PATENT DOCUMENTS

| | | | | |
|---|---|---|---|---|
| 10,997,837 B1 * | 5/2021 | Skotty | .................. | H05B 47/115 |
| 11,304,274 B1 * | 4/2022 | Fu | .......................... | H04N 23/90 |
| 2015/0028775 A1 * | 1/2015 | Zudrell-Koch | .... | H05B 45/3725 315/307 |
| 2022/0237998 A1 * | 7/2022 | Chen | ...................... | G08B 15/00 |

OTHER PUBLICATIONS

X2-Robotics, https://x2robotics.ca/mh-sr602-pir-motion-sensor, Sep. 30, 2018 (Year: 2018).*

* cited by examiner

*Primary Examiner* — Renan Luque

(74) *Attorney, Agent, or Firm* — Westbridge IP LLC

(57) ABSTRACT

A string light circuit with human body sensing includes a main control MCU module, a timer module, an audio output module, LED lights with multiple circuit-driven channels, an infrared receiving module, a mode switching module, a body-sensing module, and a power supply module. The timer module provides periodic pulse signals to the main control MCU module; the audio output module drives a speaker to generate sound; the LED lights with multiple circuit-driven channels are controlled by the main control MCU module and generate light signals; the infrared receiving module receives infrared signals to control the main control MCU module to operate in a preset mode; the mode switching module receives external mechanical actions to control the main control MCU module to operate in a preset mode; the body-sensing module senses the presence of people nearby to control the main control MCU module to operate in a preset mode.

17 Claims, 6 Drawing Sheets

STRING LIGHT CIRCUIT WITH HUMAN BODY SENSING

CROSS-REFERENCE TO RELATED APPLICATIONS

This application claims priority to Chinese Patent Application No. 202221800856.3, filed on Jul. 13, 2022, the content of which is incorporated herein by reference in its entirety.

TECHNICAL FIELD

The present application relates to the technical field of toys, and particularly to a string light circuit with human body sensing.

BACKGROUND

With the improvement of living standards, people have begun to pay attention to entertainment and the festive atmosphere. Various lighting and sound decorations and toys that enhance the festive ambiance are widely used. People enjoy various festival games, and in order to blend with the festive atmosphere, appropriate festival decorations or toys are needed. When Halloween or the Double Ninth Festival approaches, people need to create a playful or spooky atmosphere to enhance the festive mood. However, existing festival props can only perform on-off commands and lack fun.

SUMMARY

The object of the present application is to provide a string light circuit with human body sensing to address the issue of lack of fun in festive props.

In order to achieve the above objective, the present application adopts the following technical solutions.

Provided is a string light circuit with human body sensing, which comprises a main control MCU module, a timer module, an audio output module, LED lights with multiple circuit-driven channels, an infrared receiving module, a mode switching module, a body-sensing module, and a power supply module, the timer module provides periodic pulse signals to the main control MCU module to drive the main control MCU module to operate; the audio output module drives a speaker to generate sound and is controlled by the main control MCU module; the LED lights with multiple circuit-driven channels are controlled by the main control MCU module and generate light signals under the control of the main control MCU module; the infrared receiving module receives infrared signals to control the main control MCU module to operate in a preset mode; the mode switching module receives external mechanical actions to control the main control MCU module to operate in a preset mode; the body-sensing module senses presence of people nearby to control the main control MCU module to operate in a preset mode; the power supply module supplies power to the main control MCU module, the timer module, the audio output module, the LED lights with multiple circuit-driven channels, the infrared receiving module, the mode switching module, and the body-sensing module.

Preferably, the power supply module is a voltage conversion circuit with an LDO chip as a core, a 4.5 V dry battery is adopted as a power supply, a connection between the power supply and an input end of the LDO chip is controlled by a switch, and the LDO chip outputs a voltage of 3.3 V; power supply ends of the main control MCU module, the timer module, and the LED lights with multiple circuit-driven channels are directly connected to the input end of the LDO chip; the infrared receiving module and the body-sensing module are connected to an output end of the LDO chip.

Preferably, the LDO chip adopts LM1117-3.3.

Preferably, the main control MCU module is an STM8 single-chip microcomputer.

Preferably, the timer module is an active crystal oscillator circuit.

Preferably, the audio output module adopts a CS4344 chip.

Preferably, the LED lights with multiple circuit-driven channels adopt a driving circuit controlled by triodes for switching on and off.

Preferably, the infrared receiving module adopts an infrared photodiode as a receiver.

Preferably, the mode switching module is a self-recovery button that emits a pulse to the main control MCU when mechanically pressed.

Preferably, the body-sensing module is an infrared pyroelectric sensor and adopts SR602.

The present application has the following advantages.

After adopting the string light circuit with human body sensing provided by the present application, the string light circuit will generate sound and light when a person approaches by using an infrared pyroelectric sensor. Control over the sound and light can also be achieved through remote control and external buttons, enhancing the festive atmosphere and increasing the fun of the festive props.

DETAILED DESCRIPTION OF THE EMBODIMENTS

Figure 1:
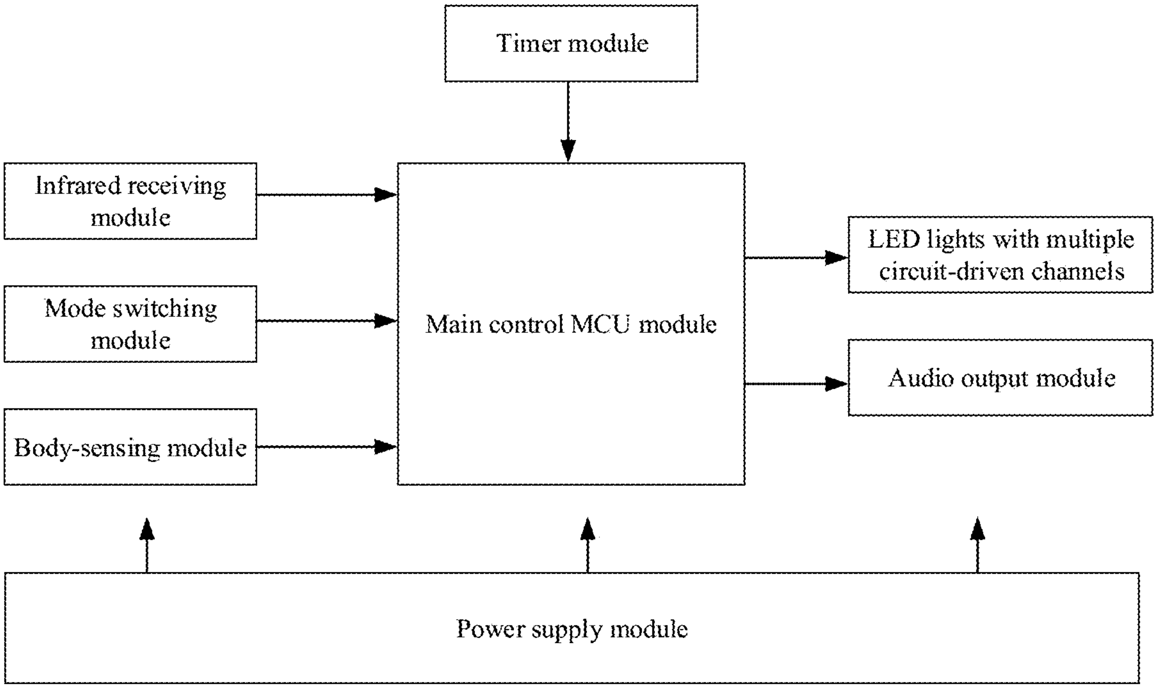
FIG. 1 is a schematic diagram of the system of the string light circuit with human body sensing according to the present application.

The following specific embodiments illustrate the implementation of the present application. Those skilled in the art will easily understand other advantages and effects of the present application based on the disclosure in this specification.

It should be noted that the structures, proportions, sizes, etc. depicted in the drawings are only used to assist in explaining the disclosed content of the specification for the understanding and reading of those skilled in the art. They are not intended to limit the conditions under which the present application can be implemented, and therefore do not have substantive technical significance. Any modification of the structure, change in proportion, or adjustment in size that does not affect the effects and purposes achievable by the present application shall still fall within the scope of the technical content disclosed in the present application. In addition, terms such as "up", "down", "left", "right", "middle" etc. used in the specification are solely for the purpose of clear description and are not used to limit the scope of implementation of the present application. Changes or adjustments in their relative relationships, without substantial changes to the technical content, are also considered within the scope of implementation of the present application.

FIG. 1 shows a string light circuit with human body sensing, which comprises a main control MCU module, a timer module, an audio output module, LED lights with multiple circuit-driven channels, an infrared receiving module, a mode switching module, a body-sensing module, and a power supply module.

The timer module provides periodic pulse signals to the main control MCU module to drive the main control MCU module to operate; the audio output module drives a speaker to generate sound and is controlled by the main control MCU module; the LED lights with multiple circuit-driven channels are controlled by the main control MCU module and generate light signals under the control of the main control MCU module; the infrared receiving module receives infrared signals to control the main control MCU module to operate in a preset mode; the mode switching module receives external mechanical actions to control the main control MCU module to operate in a preset mode; the body-sensing module senses presence of people nearby to control the main control MCU module to operate in a preset mode; the power supply module supplies power to the main control MCU module, the timer module, the audio output module, the LED lights with multiple circuit-driven channels, the infrared receiving module, the mode switching module, and the body-sensing module.

Figure 2:
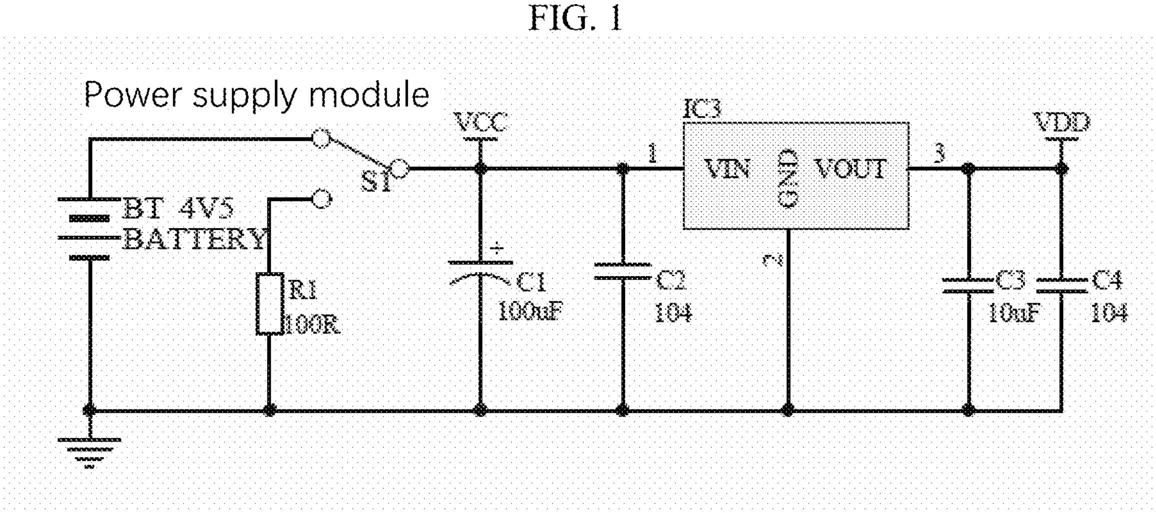
FIG. 2 is a schematic diagram of the power supply module circuit of the string light circuit with human body sensing according to the present application.

Referring to FIG. 2, in a specific implementation, the power supply module is the voltage conversion circuit with the LDO chip as the core, the 4.5 V dry battery is adopted as the power supply, the connection between the power supply and the input end of the LDO chip is controlled by a switch, and the LDO chip outputs a voltage of 3.3 V.

Figure 3:
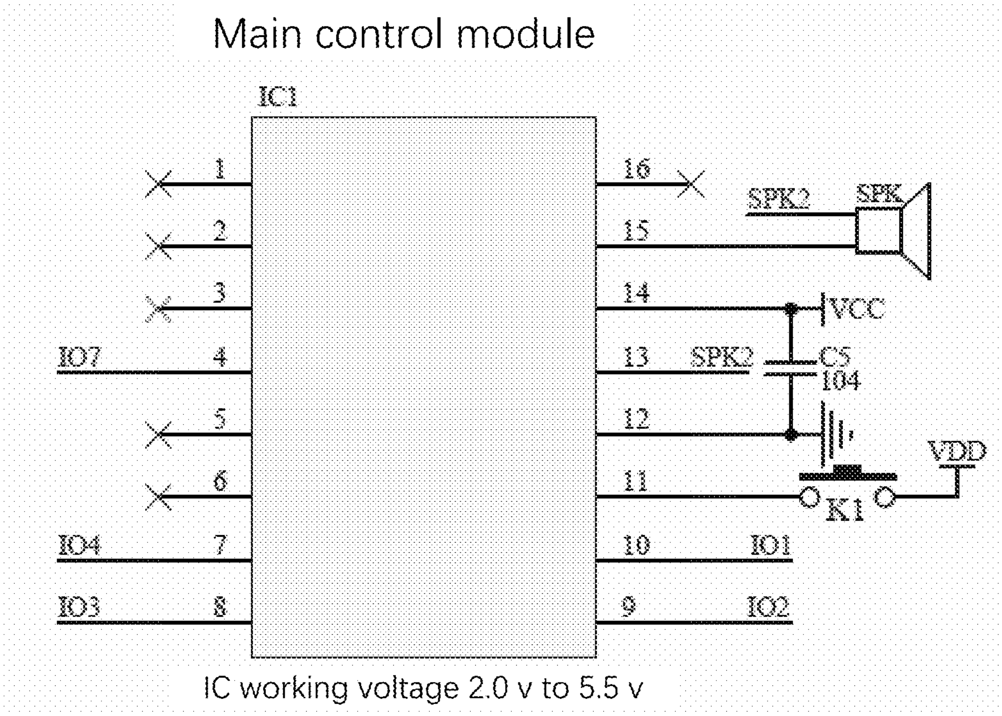
FIG. 3 is a schematic diagram of the main control MCU module circuit of the string light circuit with human body sensing according to the present application.

Referring to FIG. 3, the power supply ends of the main control MCU module, the timer module, and the LED lights with multiple circuit-driven channels are directly connected to the input end of the LDO chip; the infrared receiving module and the body-sensing module are connected to the output end of the LDO chip.

In a specific implementation, the LDO chip adopts LM1117-3.3.

Referring to FIG. 3, in a specific implementation, the main control MCU module is the STM8 single-chip microcomputer.

Figure 4:
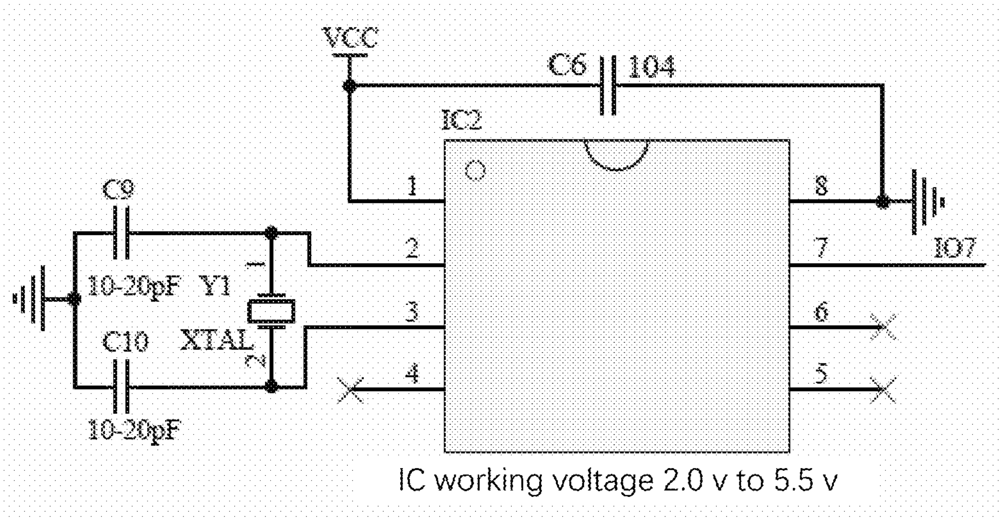
FIG. 4 is a schematic diagram of the timer module circuit of the string light circuit with human body sensing according to the present application.

Referring to FIG. 4, in a specific implementation, the timer module is the active crystal oscillator circuit.

In a specific implementation, the audio output module adopts the CS4344 chip.

Figure 5:
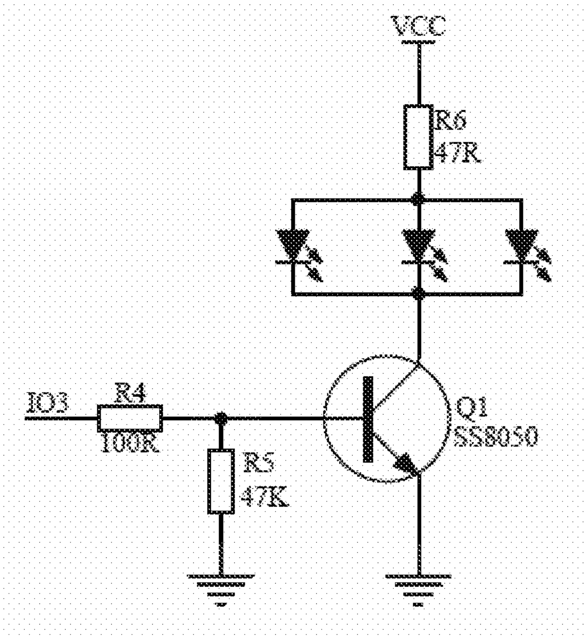
FIG. 5 is a schematic diagram of the LED light circuit with multiple circuit-driven channels of the string light circuit with human body sensing according to the present application.

Referring to FIG. 5, in a specific implementation, the LED lights with multiple circuit-driven channels adopt the driving circuit controlled by triodes for switching on and off.

Figure 8:
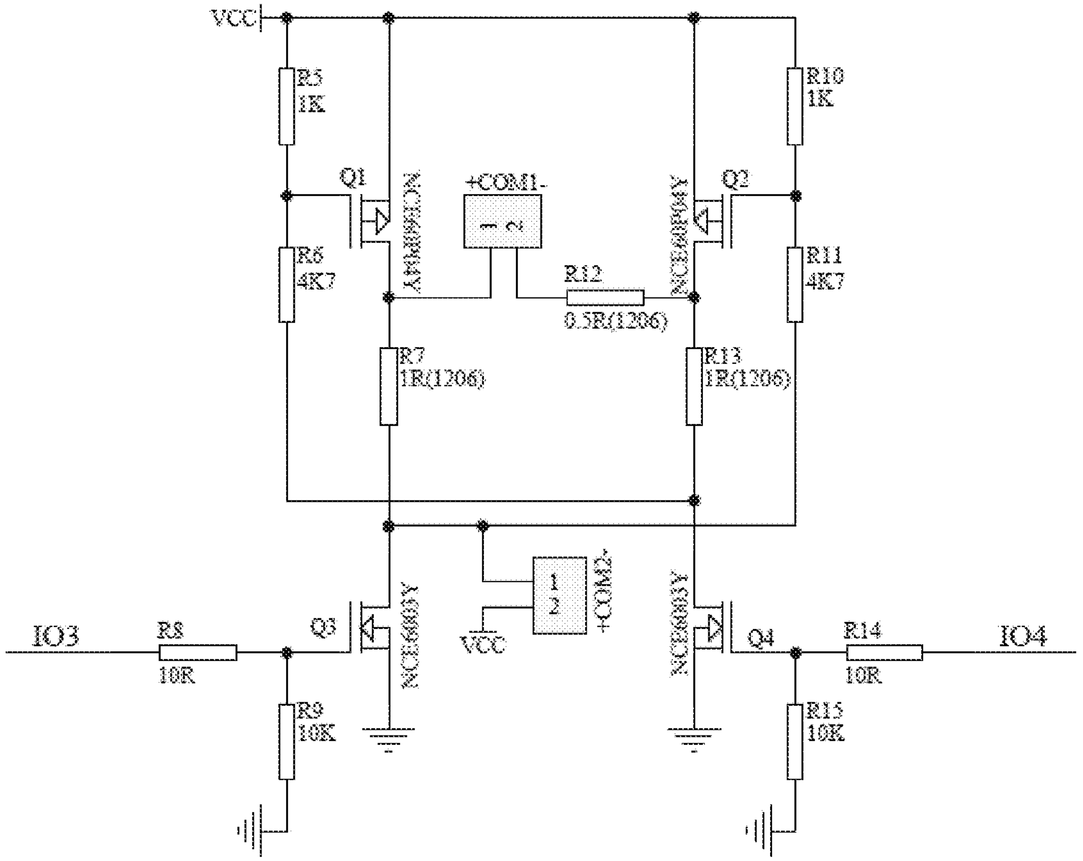
FIG. 8 is a schematic diagram of another embodiment of the LED light circuit with multiple circuit-driven channels of the string light circuit with human body sensing according to the present application.

Referring to FIG. 8, in a specific implementation, when there are only two colors or two types of LED string lights that need to be driven, a bridge circuit can be used to drive the LED lights, where the bridge is controlled by the main control MCU through triodes. By coordinating the two IO ports of the main control MCU, the anode and cathode of the power supply to the LED string lights can be switched, driving different LED string lights to illuminate.

Figure 9:
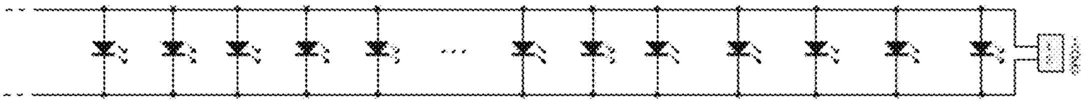
FIG. 9 is a schematic diagram of a unidirectional string light connection method in the LED light circuit with multiple circuit-driven channels of the string light circuit with human body sensing according to the present application.

Referring to FIG. 9, when there is only one type or one color of the LED string light, the LED lights can be connected in parallel to form the string light. In this case, the voltage at the driving end cannot exceed the maximum withstand voltage of any individual LED light.

Figure 10:
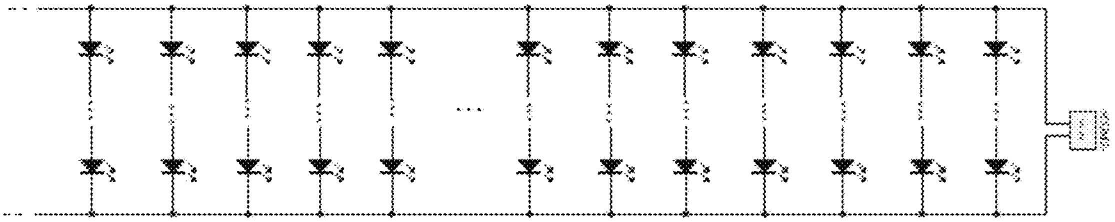
FIG. 10 is a schematic diagram of a unidirectional series-connected string light connection method in the LED light circuit with multiple circuit-driven channels of the string light circuit with human body sensing according to the present application.

Referring to FIG. 10, when the driving voltage of the LED string light is higher than that of any single LED, a plurality of LED lights can be connected in series in each parallel circuit to achieve voltage division.

Figure 11:
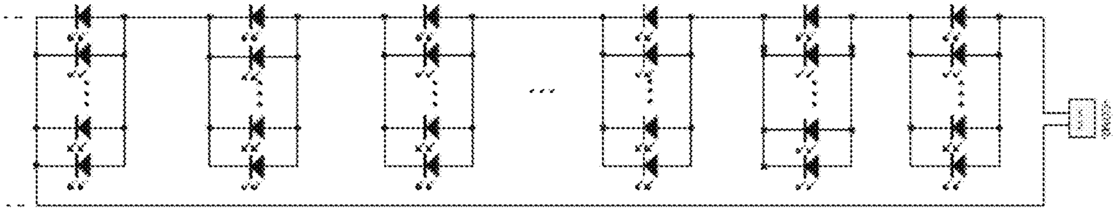
FIG. 11 is a schematic diagram of a unidirectional parallel-connected string light connection method in the LED light circuit with multiple circuit-driven channels of the string light circuit with human body sensing according to the present application.

Referring to FIG. 11, when the number of LEDs is large and the driving voltage is high, a segmented parallel connection followed by series connection can be used to connect the LED lights.

Figure 12:
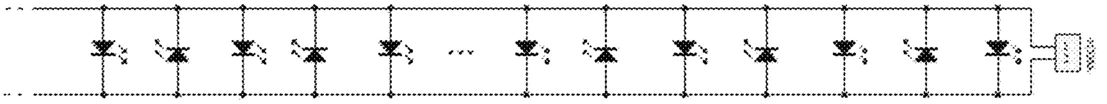
FIG. 12 is a schematic diagram of a bidirectional parallel-connected string light connection method in the LED light circuit with multiple circuit-driven channels of the string light circuit with human body sensing according to the present application.

Referring to FIG. 12, when the driving anode and the driving cathode are reversible, the LED lights with different conducting directions can be connected in the LED string light. This allows for switching between different lighting when the driving anode and the driving cathode are reversed.

Figure 13:
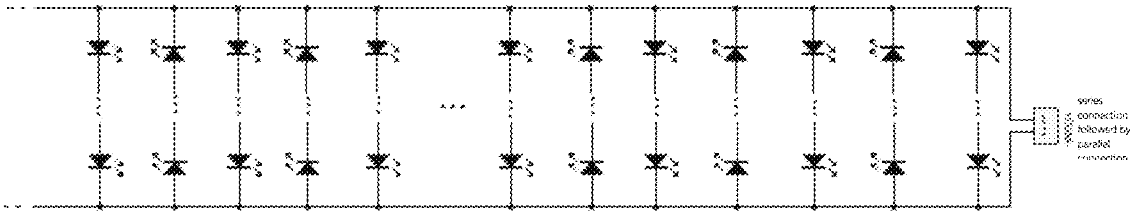
FIG. 13 is a schematic diagram of a bidirectional series-connected string light connection method in the LED light circuit with multiple circuit-driven channels of the string light circuit with human body sensing according to the present application.

Referring to FIG. 13, when the driving anode and the driving cathode are reversible and the driving voltage is high, a plurality of LEDs can be connected in series in each parallel branch to achieve voltage division.

Figure 14:
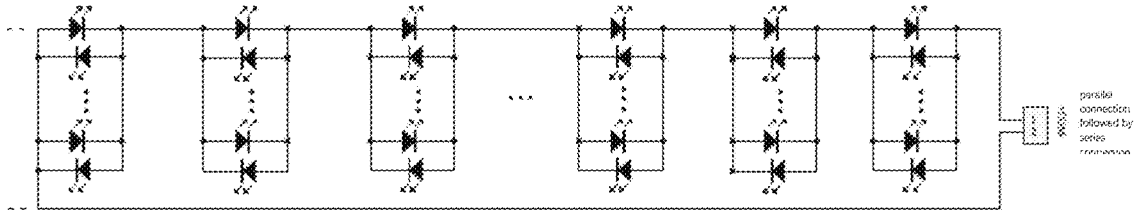
FIG. 14 is a schematic diagram of a bidirectional segmented parallel-connected string light connection method in the LED light circuit with multiple circuit-driven channels of the string light circuit with human body sensing according to the present application.

Referring to FIG. 14, when the number of LEDs is large and the driving voltage is high, a segmented parallel connection followed by series connection can be used to drive a large quantity of LED lights.

Figure 6:
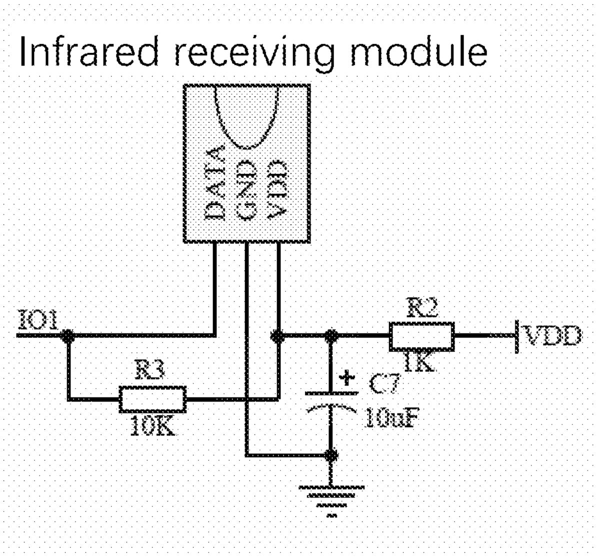
FIG. 6 is a schematic diagram of the infrared receiving module circuit of the string light circuit with human body sensing according to the present application.

Referring to FIG. 6, in a specific implementation, the infrared receiving module adopts the infrared photodiode as the receiver.

In a specific implementation, the mode switching module is the self-recovery button that emits the pulse to the main control MCU when mechanically pressed.

Figure 7:
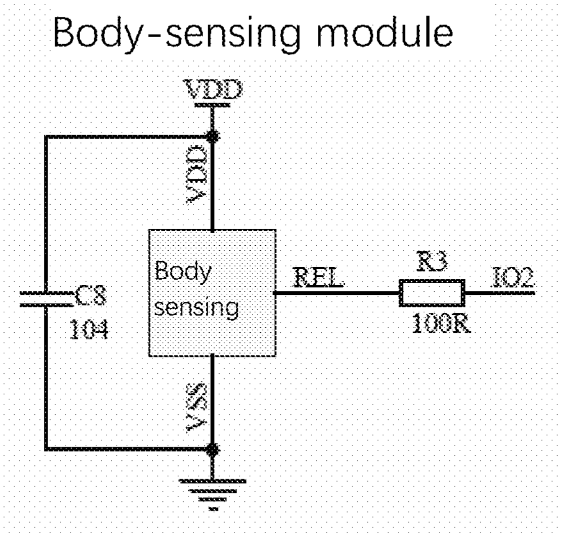
FIG. 7 is a schematic diagram of the body-sensing module circuit of the string light circuit with human body sensing according to the present application.

Referring to FIG. 7, in a specific implementation, the body-sensing module is the infrared pyroelectric sensor and adopts SR602.

The operation process is as follows.

After power-on, the system defaults to Mode 1. Pressing the button once will switch to the next mode and immediately execute the corresponding mode's functionality. The system stores the following modes:

Mode 1: Play sounds 1 to 4 in a loop once and stop. When there is sound output, the lights flash with the rhythm.

Mode 2: Play sound 1 once and stop. When there is sound output, the lights flash with the rhythm.

Mode 3: Play sound 2 once and stop. When there is sound output, the lights flash with the rhythm.

Mode 4: Play sound 3 once and stop. When there is sound output, the lights flash with the rhythm.

Mode 5: Play sound 4 once and stop. When there is sound output, the lights flash with the rhythm.

Mode 6: Lights remain on constantly, with no sound.

Mode 7: OFF (Disable all functions).

The present application provides a string light circuit with human body sensing, which generates sound and light when a person approaches by using an infrared pyroelectric sensor. Control over the sound and light can also be achieved through remote control and external buttons, enhancing the festive atmosphere and increasing the fun of the festive props.

Although the present application has been described in detail in the above general description and specific embodiments, it is evident to those skilled in the art that modifications or improvements can be made based on the present application. Accordingly, all such modifications or improvements made without departing from the spirit of the present application shall fall within the protection scope of the present application.

What is claimed is:

1. A string light circuit with human body sensing, comprising a main control MCU module, a timer module, an audio output module, LED lights with multiple circuit-driven channels, an infrared receiving module, a mode switching module, a body-sensing module, and a power supply module, wherein the timer module provides periodic pulse signals to the main control MCU module to drive the main control MCU module to operate;

the audio output module drives a speaker to generate sound and is controlled by the main control MCU module;

the LED lights with multiple circuit-driven channels are controlled by the main control MCU module and generate light signals under the control of the main control MCU module;

the infrared receiving module receives infrared signals to control the main control MCU module to operate in a preset mode;

the mode switching module receives external mechanical actions to control the main control MCU module to operate in a preset mode;

the body-sensing module senses presence of people nearby to control the main control MCU module to operate in a preset mode;

the power supply module supplies power to the main control MCU module, the timer module, the audio output module, the LED lights with multiple circuit-driven channels, the infrared receiving module, the mode switching module, and the body-sensing module;

the power supply module is a voltage conversion circuit with an low dropout (LDO) chip as a core, a 4.5 V dry battery is adopted as a power supply, a connection between the power supply and an input end of the LDO chip is controlled by a switch, and the LDO chip outputs a voltage of 3.3 V;

power supply ends of the main control MCU module, the timer module, and the LED lights with multiple circuit-driven channels are directly connected to the input end of the LDO chip; and the infrared receiving module and the body-sensing module are connected to an output end of the LDO chip.

2. The string light circuit with human body sensing according to claim 1, wherein the LDO chip adopts LM1117-3.3.

3. The string light circuit with human body sensing according to claim 1, wherein the main control MCU module is an STM8 single-chip microcomputer.

4. The string light circuit with human body sensing according to claim 1, wherein the timer module is an active crystal oscillator circuit.

5. The string light circuit with human body sensing according to claim 1, wherein the LED lights with multiple circuit-driven channels adopt a driving circuit controlled by triodes for switching on and off.

6. The string light circuit with human body sensing according to claim 1, wherein the infrared receiving module adopts an infrared photodiode as a receiver.

7. The string light circuit with human body sensing according to claim 1, wherein the mode switching module is a self-recovery button that emits a pulse to the main control MCU when mechanically pressed.

8. The string light circuit with human body sensing according to claim 1, wherein the body-sensing module is an infrared pyroelectric sensor and adopts SR602.

9. A string light circuit with human body sensing, comprising a main control MCU module, a timer module, an audio output module, LED lights with multiple circuit-driven channels, an infrared receiving module, a mode switching module, a body-sensing module, and a power supply module, wherein the timer module provides periodic pulse signals to the main control MCU module to drive the main control MCU module to operate;

the audio output module drives a speaker to generate sound and is controlled by the main control MCU module, and the audio output module adopts a CS4344 chip;

the LED lights with multiple circuit-driven channels are controlled by the main control MCU module and generate light signals under the control of the main control MCU module;

the infrared receiving module receives infrared signals to control the main control MCU module to operate in a preset mode;

the mode switching module receives external mechanical actions to control the main control MCU module to operate in a preset mode;

the body-sensing module senses presence of people nearby to control the main control MCU module to operate in a preset mode; and the power supply module supplies power to the main control MCU module, the timer module, the audio output module, the LED lights with multiple circuit-driven channels, the infrared receiving module, the mode switching module, and the body-sensing module.

10. The string light circuit with human body sensing according to claim 9, wherein the power supply module is a voltage conversion circuit with an low dropout (LDO) chip as a core, a 4.5 V dry battery is adopted as a power supply, a connection between the power supply and an input end of the LDO chip is controlled by a switch, and the LDO chip outputs a voltage of 3.3 V;

power supply ends of the main control MCU module, the timer module, and the LED lights with multiple circuit-driven channels are directly connected to the input end of the LDO chip; and the infrared receiving module and the body-sensing module are connected to an output end of the LDO chip.

11. The string light circuit with human body sensing according to claim 10, wherein the LDO chip adopts LM1117-3.3.

12. The string light circuit with human body sensing according to claim 9, wherein the main control MCU module is an STM8 single-chip microcomputer.

13. The string light circuit with human body sensing according to claim 9, wherein the timer module is an active crystal oscillator circuit.

14. The string light circuit with human body sensing according to claim 9, wherein the LED lights with multiple circuit-driven channels adopt a driving circuit controlled by triodes for switching on and off.

15. The string light circuit with human body sensing according to claim 9, wherein the infrared receiving module adopts an infrared photodiode as a receiver.

16. The string light circuit with human body sensing according to claim 9, wherein the mode switching module is a self-recovery button that emits a pulse to the main control MCU when mechanically pressed.

17. The string light circuit with human body sensing according to claim 9, wherein the body-sensing module is an infrared pyroelectric sensor and adopts SR602.

* * * * *